Aug. 7, 1962    M. H. DOWNS    3,047,910
METHOD OF MAKING THERMOPLASTIC TUBULAR CONTAINER
Filed Nov. 24, 1959
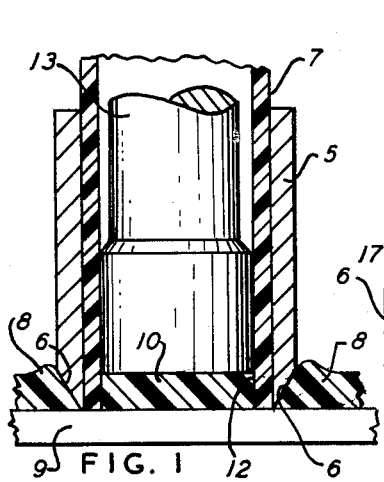
FIG. 1
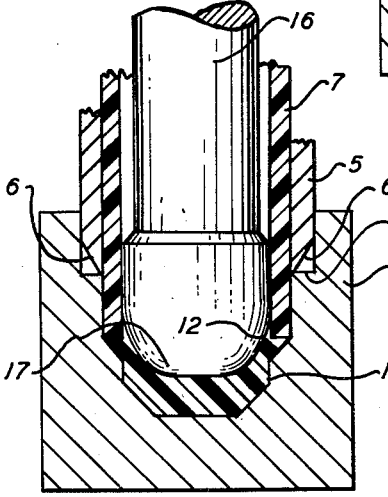
FIG. 3
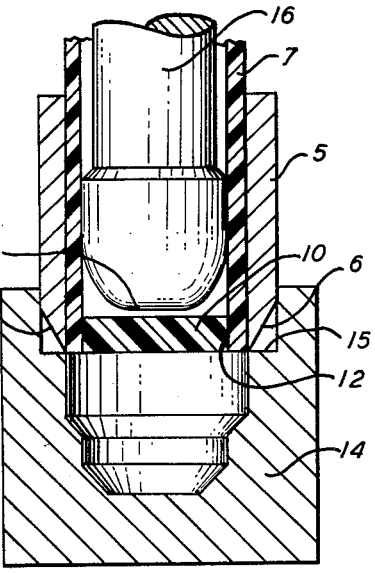
FIG. 2
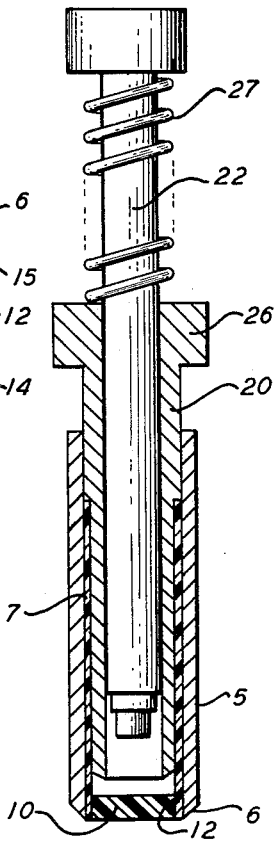
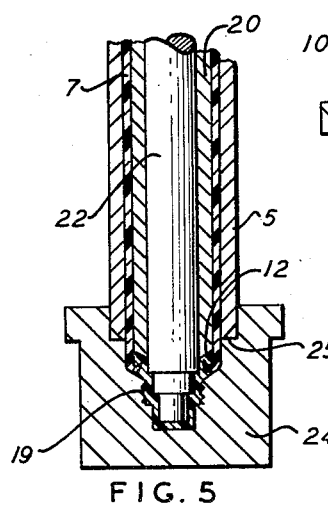
FIG. 5
FIG. 4
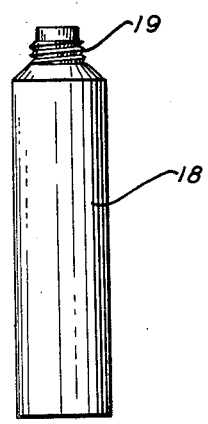
FIG. 6
INVENTOR.
MYRON H. DOWNS
BY
ATTORNEY 3,047,910
Patented Aug. 7, 1962

3,047,910
METHOD OF MAKING THERMOPLASTIC
TUBULAR CONTAINER
Myron H. Downs, Caldwell, N.J., assignor to Plastomer Development Corporation, Caldwell, N.J., a corporation of New Jersey
Filed Nov. 24, 1959, Ser. No. 855,128
5 Claims. (Cl. 18—59)

The present invention relates to a thermoplastic tubular container and to a method of fabricating such containers.

Containers formed of thermoplastic material of both rigid and flexible types are increasingly replacing soft metallic and vitreous tubes as containers for certain commodities such as cosmetics, medicinal preparations, paints, and the like, because of the decreased cost of such packaging and customer demand for the ease and facility of usage resulting particularly from flexible thermoplastic containers. Although considerable progress has been made in the last several years toward reducing the manufacturing cost of thermoplastic containers without sacrificing strength and durability, they nevertheless represent an appreciable expense to the purchasing consumer with the container frequently being actually more costly than the material therein.

It is accordingly the primary object of the present invention to provide a thermoplastic tubular container of exceptionally economical fabrication due to its high production rate.

Another object of the present invention is the provision of a thermoplastic tubular container wherein the end seals are so formed and welded to the container wall as to produce an integral container devoid of detectable juncture thus forming a strong completely sealed union.

A further object of the present invention is the provision of a method of fabricating a thermoplastic tubular container wherein the end is integrally sealed to the inner peripheral wall of the tubular portion of the container and immediately thereafter molded into any desired shape without application of heat.

Still further objects of the present invention will become apparent to those skilled in the art by reference to the accompanying drawing wherein:

FIGURE 1 is a cross-sectional view of a cutting die for forming the end closure for the thermoplastic tubular container of the present invention and thereafter molding it to one desired configuration, FIG. 2 is a cross-sectional view somewhat similar to FIG. 1 but showing the end closure welded to the tubular wall of the container and the assembly including a mandrel in position within a die just prior to forming the end closure into a different desired configuration, FIG. 3 is a cross-sectional view identical to FIG. 2 but showing completion of the end-forming for the thermoplastic tubular container, FIG. 4 is a cross-sectional view showing the end closure welded to the tubular wall similar to FIG. 2 and the entire forming assembly including a double mandrel in position above a die preparatory to lowering such assembly into the forming die to shape the end-closure into a still further desired configuration, FIG. 5 is a view similar to FIG. 3 and showing the completely formed end of the tubular container in the die of FIG. 4, and FIG. 6 is an elevational view of a completed thermoplastic tubular container formed in accordance with the present invention.

Referring now to the drawing in detail there is shown in FIG. 1 a metallic collar 5 of brass or steel and having its lower peripheral end angularly chamfered to form a relatively sharp cutting edge 6. The internal diameter of the collar 5 is so dimensioned as to snuggly receive therein the thermoplastic tubing 7 of a predetermined size from which the finished container is to be formed. Such tubing 7 may be of a rigid type but preferably is of flexible material such as polyethylene, so as to be readily collapsible and thus force material contained therein out an orifice in the end of the container, as well known to the art.

For the purpose of forming an end closure for the thermoplastic tubing 7, the chamfered collar 5 is forced by suitably applied pressure through a hot material, such as a disc, sheet or ribbon, of polyethylene 8 of suitable thickness, depending upon the final form desired, as the latter is fed onto a metallic backing plate 9 of steel or the like and while the latent heat in such material is still at a sufficiently high temperature of about 400 degrees F., as to make the material substantially molten. The sharp cutting edge 6 at the lower end of the collar 5 thus cuts out a disc 10 from the polyethylene material 8, and since the lower end of the thermoplastic tubing 7, as shown in FIGS. 1 and 2, is flush with the cutting edge 6, such disc is forced into the open end of the tubing 7. Inasmuch as the disc 10 is still at its substantially molten temperature, the edge 12 thereof is immediately welded by the melting of the inner peripheral wall surface of the thermoplastic tubing 7 thus forming a complete fusion which is so homogenous that no sharply defined detectable juncture can be subsequently observed, unless there is a preselected color difference between the polyethylene tubing 7 and the polyethylene material 8 from which the disc 10 is cut. After approximately five seconds the thermoplastic tube with its end-closure can be removed from the forming assembly.

In order to assure that the end-closure for the thermoplastic tubing 7, as formed by the disc 10, is not distorted upon cooling and remains desirably flat, air under suitable pressure or a reciprocable flat end mandrel 13 may be admitted interiorly of the tubing 7 as shown in FIG. 1 which presses the disc 10 against the backing plate 9. Since the mandrel 13 is unheated and hence at room temperature, it very rapidly reduces the temperature of the disc 10 below its plastic state by absorbing the latent heat therein thus producing a flattened homogenously sealed end-closure for the thermoplastic tubular container. It should also be pointed out that in cutting the disc 10 from the molten thermoplastic material 8, a relatively substantial pressure as high as approximately one hundred and fifty pounds may have to be applied to the collar 5 with the metallic backing plate 9 at ambient temperature, but such required pressure can be considerably reduced to a magnitude as low as approximately five pounds, simply by using a laminated plastic backing plate or other poor heat conducting material along with a mold release lubricant when required to prevent sticking, or heating the metallic backing plate 9 to a temperature more closely approaching that of the molten polyethylene material 8.

The forming assembly as shown in FIG. 2 is similar to that shown in FIG. 1 except that after the molten polyethylene disc 10 has been fused or welded at its edge 12 to the inner peripheral wall of the tubing 7, and, while such disc 10 is still at its molten temperature, the metallic collar 5 together with the telescoped thermoplastic tubing 7 and end-closure 10 is inserted into an abutting die or mold 14 of predetermined configuration, so as to form the enclosure into a desired contour. Upon insertion of the assembly into such mold 14, until the collar 5 contacts a shoulder 15 of equal outer diameter, a mandrel 16 having a suitably contoured end 17 is then forced downwardly inside the thermoplastic tubing 7, in the same manner as previously described relative to the mandrel 13 of FIG. 1. However, in this instance the slightly rounded end 17 of mandrel 16 forces the still hot but edge-sealed disc 10 downward into the recesses of the abutting die or mold 14, and, since the latter, as well as the mandrel 16, are at ambient temperature, the hot distorted end-closure disc 10 is rapidly cooled and hardened into the contour of the mold 14, as can be seen in FIG. 3.

Moreover, the application of pressure by the mandrel 16 to the still hot end closure disc 10, so as to force the latter into the mold recess, in no way destroys or weakens the previously formed weld at the edge 12 so that a tight seal is maintained. Following complete cooling of the end-closure the tube is removed from the mold, collar and mandrel, resulting in a thermoplastic tubular container having an end closure conforming to the contour of the mold 14. The only critical factor involved in producing the tubular container in the foregoing manner is the time interval involved in punching out the hot disc 10, getting the assembly into the mold, and applying force to the mandrel to thus cause the hot disc 10 to conform to the mold contour. If this is not done rapidly heat loss by the disc 10, through conduction to the mold and mandrel, causes it to cool to such an extent that it is no longer soft enough to readily mold without considerably greater pressure, and, if too cool, then even increased pressure will not compensate for the plasticity required to form a satisfactory molded end-closure.

A slight modification of the present invention is shown in FIGS. 4 and 5 wherein a double mandrel is employed. Here again the metallic collar 5 with its chamfered cutting edge 6 is utilized to cut out the hot disc 10, which has its edge 12 again welded to the inner peripheral wall of the thermoplastic tubing 7. In this instance, however, the tubing 7 surrounds a hollow mandrel 20 having an open lower end and a second spring-pressed inner mandrel 22 reciprocally moves within the hollow mandrel 20 upon application of pressure. A mold 24, similar to that of the mold 14 except that its stepped recesses of decreasing diameter have parallel walls rather than some of the angular walls of the mold 14, receives the assembly of the metallic collar and the two mandrels, as well as the thermoplastic tubing 7 carrying the welded hot end-closure disc 10, upon application of pressure to the upper end of the spring-pressed inner mandrel 22.

When the downward movement of the collar 5 is stopped by the die shoulder 25, the double mandrel assembly together with the polyethylene tubing 7 continues downwardly into the recesses of the mold 24 until the end of the polyethylene tubing 7 reaches the tapered wall of the die recess as seen in FIG. 5. At this time the enlarged head 26 of the hollow mandrel 20 will have engaged the upper end of the collar 5 to thus arrest further downward movement of the tubing 7 and the hollow mandrel 20. However, the applied pressure continues to cause the downward movement of the inner mandrel 22 against the tension of its surrounding compression spring 27, resulting in the substantially mating configuration of its stepped-head of decreasing diameter contacting the still hot and edge-welded polyethylene disc 10 and forcing it into the lowermost recesses of the die 24 to form a stepped sharp-shouldered and threaded end-closure for a container 18, such as shown by the precise configuration of the threaded top 19 in FIG. 6.

It will be noted, however, that in this embodiment of the present invention the spacing between the stepped-head of the inner mandrel 22 and the mating steps of die recesses are such that at the temperature of the hot end-closure disc 10 and the applied pressure, an upward flow of the molten end-closure disc 10 between the mandrel 22 and the walls of the die recesses is produced, thereby causing a slight inward curling of the peripheral edge of the thermoplastic tubing 7 at the juncture of the weld 12. Such inward curling cannot be observed in those instances where both the polyethylene tubing 7 and the end-closure disc 10 are of the same color and, as hereinbefore stated with respect to the modification shown in FIGS. 1 to 3, a homogenous weld having no sharply defined detectable juncture results. However, in the modification of FIGS. 4 and 5 by using a polyethylene tubing 7 of one color and a polyethylene disc 10 of a distinctly different color wherein the spacing between the mandrel end and recess wall is relatively small, a definite inward curling of the peripheral end of the tube 7 is clearly observable, such as shown in FIG. 5, and which likewise results in a strong dependable weld. It should also be readily apparent that by varying the spacing of the respective mandrel ends, as well as applied pressure and relative movement of mandrels, that a variety of configurations of the seal area may be readily obtained.

From the foregoing description of the present invention it is believed to be obvious to those skilled in the art that the process is one that lends itself very readily to mechanization. For example, a rotary table or conveyor may be utilized that indexes through a plurality of stations at which the successive operations of loading the thermoplastic tubing on the forming assembly, blanking out the hot thermoplastic discs from a continuously fed substantially molten material, the welding of the disc to the thermoplastic tubing, forming the end-closure by reciprocation of the mandrel assembly into the mold, and unloading the finished container, can be very readily and rapidly performed. Also, since the speed of operation and the dwell time at each work station can be precisely set the aforementioned criticality of performing the necessary operations before the heated thermoplastic end-closure disc cools is readily accomplished. By the use of such mechanization not only is the manufacturing costs of the thermoplastic container materially reduced but the finished product is uniformly provided with an end-closure welded at its peripheral edge to the inner circumferential wall of the thermoplastic tubing which produces a very strong and homogenous seal leaving no observable juncture in the finished container.

Although several embodiments of the present invention have been shown and described it is to be understood that still further modifications of both the specific process and product may be made without departing from the spirit and scope of the appended claims.

I claim:

1. The method of fabricating a thermoplastic tubular container comprising introducing a tubular thermoplastic member into a forming collar, cutting a disc from molten thermoplastic material, forcing the cut disc of molten thermoplastic material into the open end of said tubular member while retained by said forming collar, and allowing the latent heat of the molten disc to weld the peripheral edge of said disc to the inner circumferential wall of said tubular member and form an end closure for the tubular container.

2. The method of fabricating a thermoplastic tubular container comprising introducing a tubular thermoplastic member into a forming collar, cutting a disc from molten thermoplastic material, forcing the cut disc of molten thermoplastic material into the open end of said tubular member while retained by said forming collar, allowing the latent heat of the molten disc to weld the peripheral edge of said disc to the inner circumferential wall of said tubular member to form an end closure for the tubular container, and applying pressure through said tubular container to said sealed end closure to shape the latter to a desired contour.

3. The method of fabricating a thermoplastic tubular container comprising introducing a tubular thermoplastic member into a forming collar provided with a chamfered end, forcing the chamfered end of said forming collar into molten thermoplastic material to cut a disc therefrom which is forced into the adjacent end of said tubular member, allowing the peripheral edge of said disc to become welded to the circumferential wall of said tubular member to form an end closure therefor, and applying pressure through the interior of said tubular member against the sealed end closure while the latter contains latent heat to force said closure into an abutting die to shape the end closure to a desired contour.

4. The method of fabricating a thermoplastic tubular container comprising introducing a tubular thermoplastic member into a forming collar, cutting a disc from molten thermoplastic material, forcing the cut disc of molten thermoplastic material into the open end of said tubular member while retained by said forming collar, allowing the latent heat of the molten disc to weld the peripheral edge of said disc to the inner circumferential wall of said tubular member to form an end closure for the tubular container, and passing a mandrel provided with an end of predetermined configuration axially through said tubular member to force the molten disc into a die having a substantially mating configuration to that of the mandrel end to form an end closure of desired contour for the thermoplastic tubular container without destroying or weakening the welded juncture.

5. The method of fabricating a thermoplastic tubular container comprising introducing a tubular member into a forming collar with their respective lower ends substantially flush with each other, cutting a disc from molten thermoplastic material, forcing the cut disc of molten thermoplastic material into the open end of said tubular member while retained by said forming collar, allowing the latent heat of the molten disc to weld the peripheral edge of said disc to the inner circumferential wall of said tubular member to form an end closure for the tubular container, passing a mandrel provided with an end of predetermined configuration axially through said tubular member into contact with the welded molten disc, and applying sufficient pressure to said mandrel to force the molten material of said disc into a die having a substantially mating configuration to that of said mandrel end to form an end closure of desired contour for said tubular container and with said pressure forcing the molten material upwardly between the die and mandrel end with an attendant slight inward curling of the peripheral end of the tubular member at the welded juncture without weakening or destroying such weld.

References Cited in the file of this patent

UNITED STATES PATENTS

| | | |
|---|---|---|
| 1,486,937 | Taliaferro | Mar. 18, 1924 |
| 1,678,330 | Clyne | July 24, 1928 |
| 1,899,524 | Parks | Feb. 28, 1933 |
| 1,978,048 | Heintz | Oct. 23, 1934 |
| 2,219,576 | Moreland | Oct. 29, 1940 |
| 2,550,455 | Davies | Apr. 24, 1951 |
| 2,632,918 | Bergstein | Mar. 31, 1953 |
| 2,663,909 | Maier et al. | Dec. 29, 1953 |
| 2,697,057 | Senger et al. | Dec. 14, 1954 |
| 2,794,574 | McGeorge et al. | June 4, 1957 |
| 2,823,422 | Schneider | Feb. 18, 1958 |
| 2,878,513 | Slaughter | Mar. 24, 1959 |
| 2,922,832 | Gottschall et al. | June 26, 1960 |